(12) United States Patent
Cannon et al.

(10) Patent No.: US 8,270,387 B2
(45) Date of Patent: Sep. 18, 2012

(54) SYSTEMS AND METHODS FOR IMPROVED DIGITAL RF TRANSPORT IN DISTRIBUTED ANTENNA SYSTEMS

(75) Inventors: Jeffrey J. Cannon, Victoria, MN (US); Dean Zavadsky, Shakopee, MN (US); Philip M. Wala, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 388 days.

(21) Appl. No.: 12/686,488

(22) Filed: Jan. 13, 2010

(65) Prior Publication Data

US 2010/0177760 A1 Jul. 15, 2010

Related U.S. Application Data

(60) Provisional application No. 61/144,349, filed on Jan. 13, 2009.

(51) Int. Cl.
*H04J 3/00* (2006.01)
(52) U.S. Cl. ...................................... 370/345
(58) Field of Classification Search .......... 370/345, 370/336, 337, 329, 328, 321, 352, 376, 295, 370/281, 294, 458, 395.41, 462, 468, 4, 478, 370/480, 498; 375/350, 229
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmüller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Chien-Yeh Lee | |
| 5,243,598 A | 9/1993 | Lee | |
| 5,321,849 A | 6/1994 | Lemson | |
| 5,339,184 A | 8/1994 | Tang | |
| 5,898,693 A * | 4/1999 | Vecchi et al. ................. | 370/446 |
| 8,135,102 B2 * | 3/2012 | Wiwel et al. ................. | 375/350 |
| 2008/0013639 A1 | 1/2008 | Rick et al. | |
| 2008/0013654 A1 | 1/2008 | Rick et al. | |
| 2008/0019706 A1 | 1/2008 | Levinson et al. | |

FOREIGN PATENT DOCUMENTS

| | | |
|---|---|---|
| EP | 0391597 | 10/1990 |
| WO | 9115927 | 10/1991 |

OTHER PUBLICATIONS

International Searching Authority, "International Search Report", Aug. 5, 2010, Published in: WO.

(Continued)

*Primary Examiner* — Chi Pham
*Assistant Examiner* — Alexander Boakye
(74) *Attorney, Agent, or Firm* — Fogg & Powers LLC

(57) ABSTRACT

Systems and methods for improved digital RF transport in a DAS are provided. In one embodiment, a transceiver comprises: a receive path circuit including an RF reception interface coupled to an ADC, the ADC receiving a down-converted analog RF spectrum from the RF reception interface and producing a digitized RF spectrum at an input sampling rate; a logic device receiving the digitized RF spectrum and producing a first set of baseband data samples at a first sampling rate, corresponding to a first spectral region of the analog RF spectrum and a second set of baseband data samples at a second sampling rate, corresponding to a second spectral region of the analog RF spectrum. The logic device maps the first set and second sets of baseband data samples to a respective first set and second set of timeslots of a serial data stream transport frame.

27 Claims, 10 Drawing Sheets

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

SYSTEMS AND METHODS FOR IMPROVED DIGITAL RF TRANSPORT IN DISTRIBUTED ANTENNA SYSTEMS

CROSS-REFERENCE TO RELATED APPLICATIONS

This application claims the benefit of U.S. Provisional Application No. 61/144,349, filed on Jan. 13, 2009, which is incorporated herein by reference in its entirety.

BACKGROUND

A Distributed Antenna System (DAS) is a network of spatially separated antenna nodes connected to a common node via a transport medium that provides wireless service within a geographic area or structure. Common wireless communication system configurations employ a host unit as the common node, which is located at a centralized location (for example, at a facility that is controlled by a wireless service provider). The antenna nodes and related broadcasting and receiving equipment, located at a location that is remote from the host unit (for example, at a facility or site that is not controlled by the wireless service provider), are also referred to as "remote units." Radio frequency (RF) signals are communicated between the host unit and one or more remote units. In such a DAS, the host unit is typically communicatively coupled to one or more base stations (for example, via wired connection or via wireless connection) which allow bidirectional communications between wireless subscriber units within the DAS service area and communication networks such as, but not limited to, cellular phone networks, the public switch telephone network (PSTN) and the Internet. A DAS can provide, by its nature, an infrastructure within a community that can scatter remote units across a geographic area for providing wireless services across that area.

A digital DAS is a system wherein the host unit and remote units transport radio signal information to one another by digital means (for example, by digitally sampling a wireless radio frequency (RF) spectrum at a remote unit and transmitting the digital sample data to the host unit by fiber optics). One problem with the digital DAS occurs when radio signals of interest within the RF spectrum are separated by bandwidths containing no signals interest. In that case, fiber bandwidth within the digital DAS is wasted because all of the digital samples need to be transported at a rate sufficient to cover the full range of frequencies, not just the portions containing signals of interest.

For the reasons stated above and for other reasons stated below which will become apparent to those skilled in the art upon reading and understanding the specification, there is a need in the art for improved systems and methods for digital RF transport.

SUMMARY

Systems and methods for improved digital RF transport in a DAS are provided. In one embodiment, a transceiver comprises: a receive path circuit including an RF reception interface coupled to an ADC, the ADC receiving a down-converted analog RF spectrum from the RF reception interface and producing a digitized RF spectrum at an input sampling rate; a logic device receiving the digitized RF spectrum and producing a first set of baseband data samples at a first sampling rate, corresponding to a first spectral region of the analog RF spectrum and a second set of baseband data samples at a second sampling rate, corresponding to a second spectral region of the analog RF spectrum. The logic device maps the first set and second sets of baseband data samples to a respective first set and second set of timeslots of a serial data stream transport frame.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

In accordance with common practice, the various described features are not drawn to scale but are drawn to emphasize features relevant to the present invention. Reference characters denote like elements throughout figures and text.

DETAILED DESCRIPTION

Embodiments of the present invention address the problem of efficiently transporting multiple non-adjacent communications bands within the digital transport of a distributed antenna system. This is accomplished by segregating from a digitized RF spectrum a plurality of smaller spectral regions that include relevant signals of interest, and discarding information not within those spectral regions. This segregation further allows the spectral regions to be processed independently, and each independently re-sampled (at a sampling rate based on their respective bandwidths) so that they can be transmitted over a common serial transport link. Each spectral region is transmitted using a number of timeslots in the serial bit stream that is a function of their respective bandwidths rather than the bandwidth of the entire digitized RF spectrum.

Figure 1:
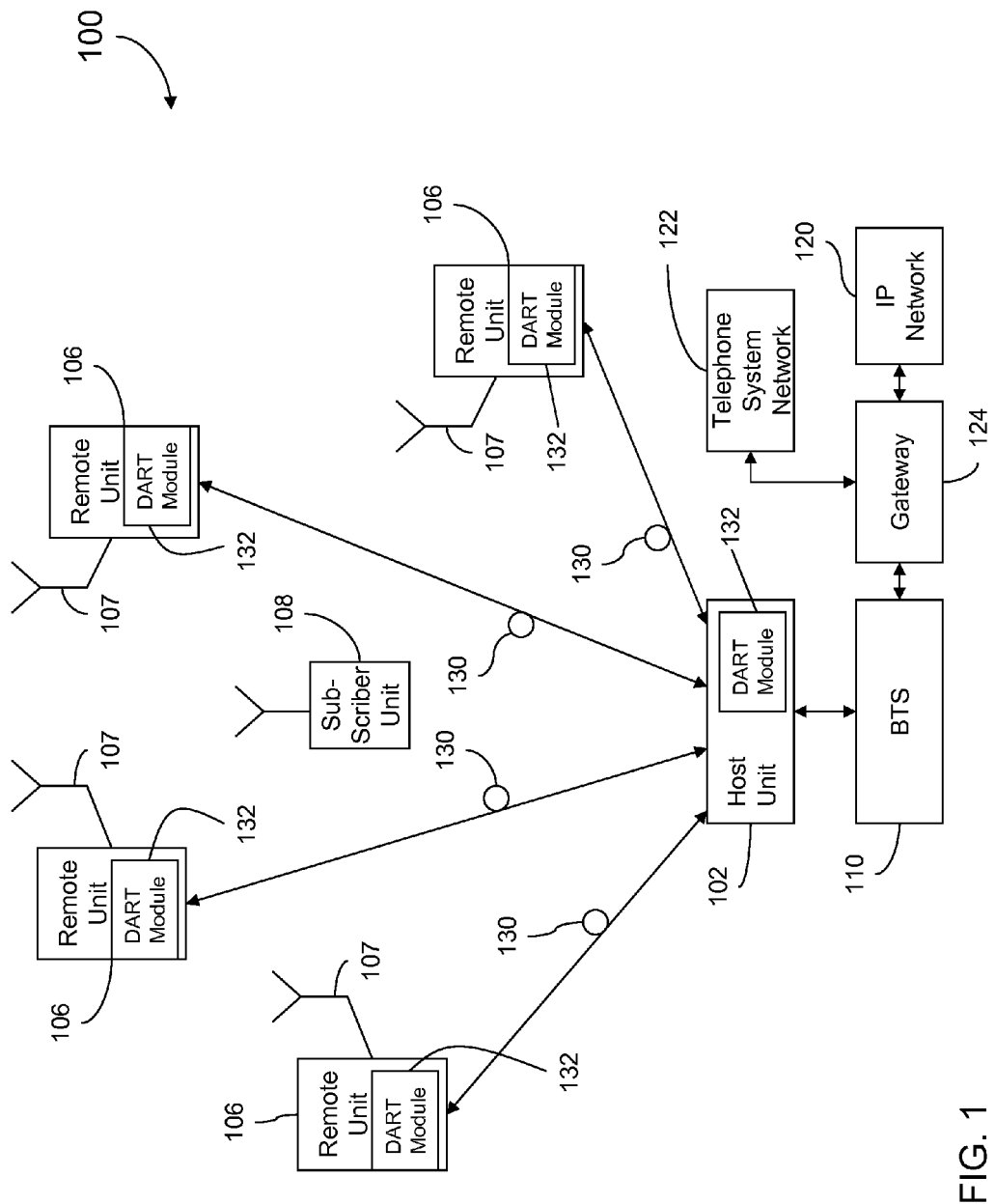
FIG. 1 is a block diagram of a distributed antenna system of one embodiment of the present invention.

FIG. 1 is a block diagram of a distributed antenna system (DAS) 100 of one embodiment of the present invention for receiving and distributing radio frequency signals within a coverage area. DAS 100 includes a host unit 102 and a plurality of remote units 106. At the physical layer, host units 102 and remote units 106 are communicatively coupled via a communication link 130 to form a bidirectional communication network comprising a plurality of point-to-point communication links 130. In one embodiment, one or more of communication links 130 are fiber optic cable as indicated in FIG. 1. Optionally, host units 102 and remote units 106 may be interconnected via coaxial cable, or a combination of both coaxial cable and fiber optic cable. Additionally, in other embodiments, one or more of communication links 130 are wireless millimeter wave links (e.g. E Band/70 GHz radio). Here a millimeter signal transceiver is coupled to host unit 102 and each remote unit 106 on each end of communication link 130. In yet another embodiment, one or more of communication links 130 a microwave radio links where microwave radio transceivers are coupled to host unit 102 and remote units 106.

Remote units 106 each house electronic devices and systems used for wirelessly transmitting and receiving modulated radio frequency (RF) communications via antenna 107 with one or more mobile subscriber units 108. Host unit 102 is coupled to at least one base transceiver station (BTS) 110 often referred to as a base station. BTS 110 communicates voice and other data signals between the respective host unit 102 and a larger communication network via a gateway 124 coupled to a telephone system network 122 (for example, the public switched telephone network and/or wireless service provider networks) and an internet protocol (IP) network 120, such as the Internet. In one embodiment, DAS 100 comprises part of a cellular telephone network and subscriber units 108 are cellular telephones. In alternate embodiments, BTS 110 and host unit 102 may be interconnected via coaxial cable, fiber optic cable, wireless communication links, or any combination thereof.

Downlink RF signals are received from the BTS 110 at the host unit 102, which the host unit 102 uses to generate one or more downlink transport signals for transmitting to one or more of the remote units 106. Each such remote unit 106 receives at least one downlink transport and reconstructs the downlink RF signals from the downlink transport signal and causes the reconstructed downlink RF signals to be radiated from a remote antenna 107 coupled to or included in that remote unit 106. A similar process is performed in the uplink direction. Uplink RF signals received at one or more remote units 106 from subscriber 108 are used to generate respective uplink transport signals that are transmitted from the respective remote units 106 to the host unit 102. The host unit 102 receives and combines the uplink transport signals transmitted from the multiple remote units 106. The host unit 102 communicates the combined uplink RF signals to the BTS 110 over a broadband transport medium, such as a coaxial cable.

DAS 100 comprises a digital DAS transport meaning that the downlink and uplink transport signals transmitted between host unit 102 and remote units 106 over communication links 130 are generated by digitizing the downlink and uplink RF signals, respectively. In other words, the downlink and uplink transport signals are not analog RF signals but instead are digital data signals representing digital RF samples of a modulated RF signal. These digital data signals, which may be alternately referred to herein as "digital RF", "digitally sampled RF" and "digital baseband", may comprise digital representations of an RF, IF or baseband version of the original RF signal. Further, these samples may be defined as real samples, or as pairs of complex (IQ or quadrature) samples. For example, if a particular communication signal destined for transmission to subscriber unit 108 is a modulated RF signal in the 900 MHz band, then host unit 102 will generate baseband digital samples of the modulated 900 MHz RF signal from BTS 110, which are then distributed by host unit 102 to the remote units 106. Alternatively, an all-digital BTS may generate baseband digital samples directly. At the remote units, the digital samples of the modulated RF signal are converted from digital into an analog RF signal to be wirelessly radiated from the antennas 107. In the uplink analog RF signals received at remote unit 106 are digitally sampled to generate digital RF data samples for the uplink transport signals. BTS 110, host unit 102 and remote units 106 each accommodate processing communication signals for multiple bands and multiple modulation schemes simultaneously. In the embodiment shown in FIG. 1, each remote unit 106 and host unit 102 comprises a digital to analog radio frequency transceiver (DART) module 132 configured to conserve the available bandwidth of the communication links 130 by separating and individually processing spectral regions of interest from a larger RF spectrum. More detail regarding the digital to analog radio frequency transceiver (DART) module 132 is provided below.

Figure 2:
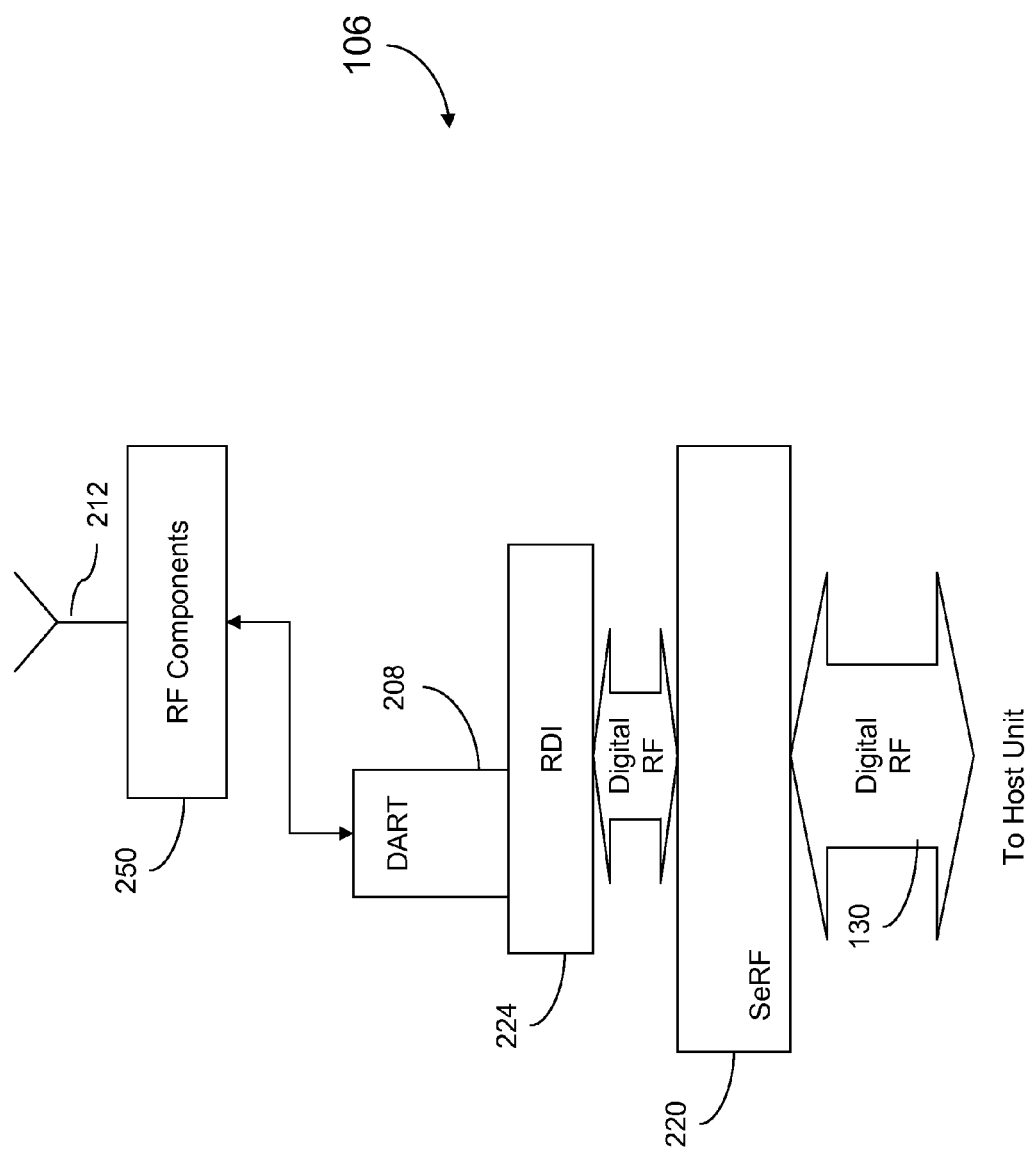
FIG. 2 is a block diagram of a remote unit of one embodiment of the present invention.

FIG. 2 is a block diagram of one embodiment of a remote unit 106. Remote unit 106 includes a serial radio frequency (SeRF) module 220, a digital to analog radio frequency transceiver (DART) module 208, a remote DART interface board (RDI) 224, and wireless RF components 250 that include electronics such as power amplifier, a duplexer, a low noise amplifier and other RF electronics coupled to an antenna 212. In alternate embodiments, SeRF modules and DART modules described herein are realized using FPGAs, ASICs, digital signal processing (DSP) boards, or similar devices.

DART module 208 provides bi-directional conversion between analog RF signals and digital sampled RF for the downlink and uplink transport signals transmitted between host unit 102 and remote units 106. In the uplink, antenna 212 receives a wireless RF signal from subscriber 208 and passes the RF signal to DART module 208 via RF components 250. DART module 208 receives an incoming analog RF signal spectrum and samples a predefined bandwidth of the incoming analog RF signal spectrum at a first sampling rate to generate digital data for use by SeRF module 220, as described below.

In the downlink, DART module 208 receives digitally sampled RF data from SeRF module 220, converts the digital RF samples to analog RF, and up converts the analog RF to a broadcast frequency for wireless transmission. After a signal is converted to an analog RF signal by DART module 208, the analog RF signal is sent to RF components 250 for broadcast via antenna 212. One of ordinary skill in the art upon reading this specification would appreciate that DART modules may function to optionally convert the digital RF samples into intermediate frequency (IF) samples instead of, or in addition to, baseband digital samples.

DART modules in a remote unit are specific for a particular frequency band. A single DART module operates over a defined frequency band regardless of the modulation technology being used. Thus frequency band adjustments in a remote unit can be made by replacing a DART module covering one frequency band with a DART module covering a different frequency band. For example, in one implementation DART module 208 is designed to transmit 850 MHz cellular transmissions. As another example, in another implementation DART module 208 transmits 1900 MHz PCS signals. Some of the other options for a DART module 208 include Nextel 800 band, Nextel 900 band, PCS full band, PCS half band, BRS, and the European GSM 900, GSM 1800, and UMTS 2100. By allowing different varieties of DART modules 208 to be plugged into RDI 224, remote unit 106 is configurable to any of the above frequency bands and technologies as well as any new technologies or frequency bands that are developed.

SeRF module 220 provides bi-directional conversion between a digital data stream and a high speed optical serial data stream. In the uplink, SeRF module 220 receives incoming digital data streams from DART module 208 and sends a serial optical data stream over communication link 130 to host unit 102. In the downlink, SeRF module 202 receives an optical serial data stream from host unit 102 and provides a digital data stream to DART module 208. Although FIG. 2 illustrates a single DART module coupled to a SeRF module, a single remote unit housing may operate over multiple bands by possessing multiple DART modules. In one such embodiment, RDI 224 provides separate connection interfaces allowing each DART module to communicate RF data samples with SeRF module 220. In one embodiment a SeRF module actively multiplexes the signals from multiple DART modules (each DART module processing a different RF band) such that they are sent simultaneously over a single transport communication link 130.

Figure 3:
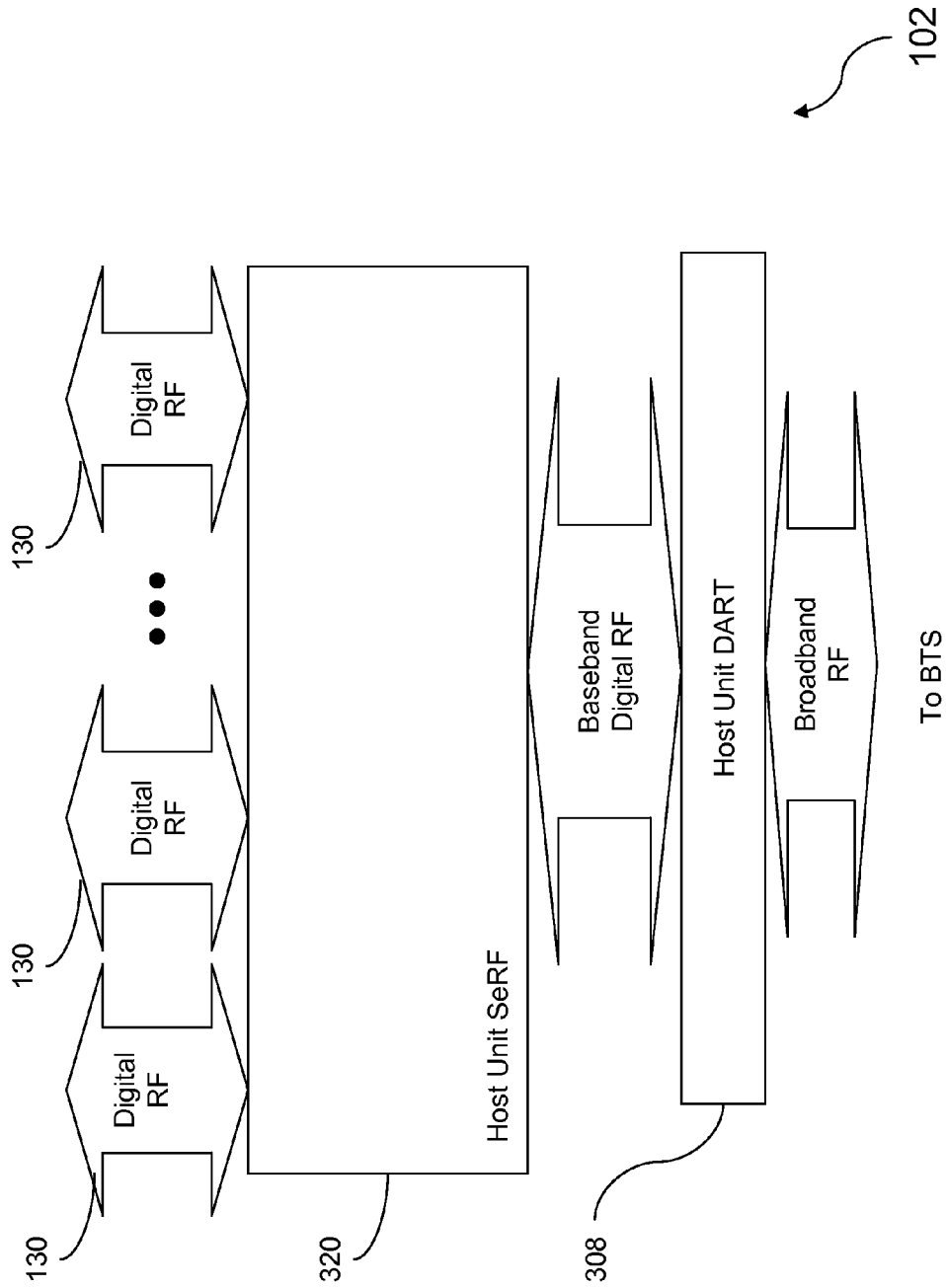
FIG. 3 is a block diagram of a host unit of one embodiment of the present invention.

FIG. 3 is a block diagram illustrating one embodiment of a host unit 102. Host unit 102 is communicatively coupled to multiple remote units 106 via the communication links 130, as described with respect to FIG. 1. Host unit 102 includes a host unit digital to analog radio frequency transceiver (DART) module 308 and a host unit serial radio frequency (SeRF) module 320. SeRF module 320 provides bi-directional conversion between digital RF data samples and the multiple high speed optical serial data streams to and from the remote units 106. In the uplink direction, SeRF module 320 receives incoming serial optical data streams from a plurality of remote units, extracts from each serial stream the digitized baseband RF data samples corresponding to each frequency band, and sums the multiple sample streams for each band into one composite stream of RF data samples for that band. DART module 308 provides a bi-directional interface between SeRF module 320 and one or more base stations, such as BTS 110. As with remote units 106, when host unit 320 operates over multiple bands with multiple base stations, a separate DART module 308 is provided for each frequency band.

As used herein, the terms Host SERF and Host DART refer to SeRF and DART modules located in a host unit 102. The terms Remote SeRF and Remote DART refer to SeRF and DART modules located in a remote unit 106.

Figure 4A:
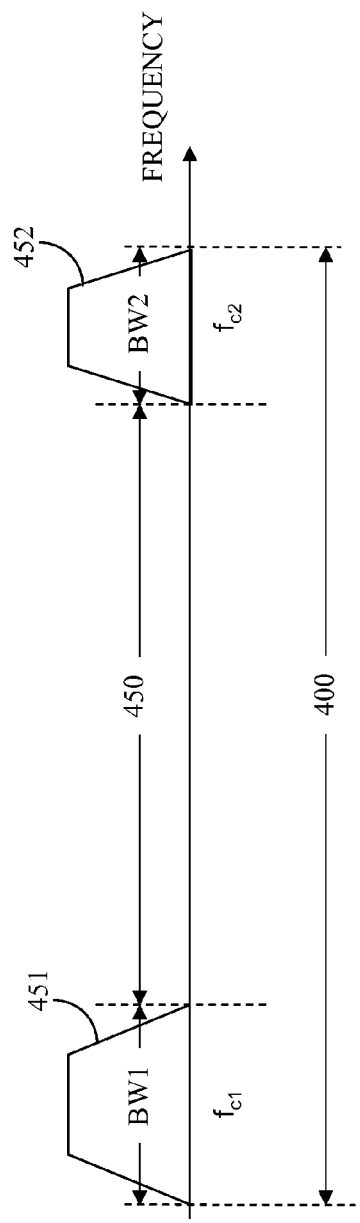
FIGS. 4A-4C illustrate mapping of RF spectral regions to transport frame timeslots, of one embodiment of the present invention.

FIG. 4A illustrates a digitized RF spectrum 400 that is processed by either a Host or Remote DART module of one embodiment of the present invention. In one embodiment, digitized RF spectrum 400 represents a digital sampling of an uplink analog signal received by a remote unit 106. In another embodiment, digitized RF spectrum 400 is instead a representation of a downlink signal received at a host unit 102 intended for wireless transmission by a remote unit 106. Within spectrum 400, spectral regions 451 and 452 both contain "relevant" RF signals. That is, the DART module has been programmed to recognize that spectral regions 451 and 452 contain information to be transported over DAS 100. The first spectral region 451 includes a first bandwidth (BW1) while the second spectral region 452 includes a second bandwidth (BW2). The spectral region 450 corresponds to a non-relevant region of spectrum 400 that falls between regions 451 and 452. The DART module is thus not concerned with the transmission or reception of any signals within the non-relevant spectral region 450. However, embodiments comprising multiple DART modules are contemplated as within the scope of the present invention as mentioned above. In one such alternate embodiment of either a remote unit or a host unit, a region defined as non-relevant to a first DART module can be defined as a relevant spectral region to a second DART module.

Figure 4B:
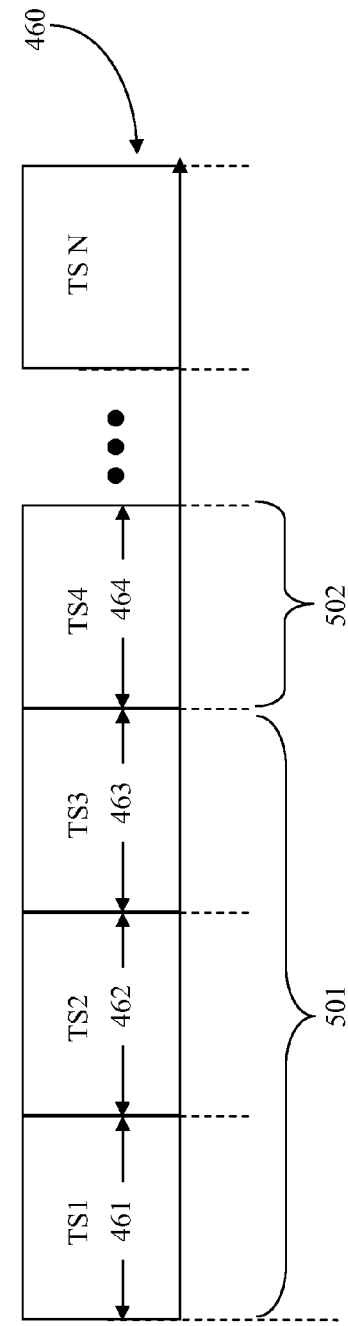

FIG. 4B is a block diagram illustrating one embodiment of a mapping of digitized RF spectrum 400 onto timeslots of an N timeslot digital transport frame 460 carried over communication links 130. Spectral region is 451 is processed by the DART module for transmission via digital transport frame 460 by re-sampling that portion of digitized RF spectrum 400 corresponding to spectral region 451. The re-sampling rate used will determine the number of timeslots that will be used to transport spectral region 451 and is based on the size of bandwidth BW1. For example, in one embodiment, three timeslots are required to transport a bandwidth of size BW1. Accordingly, timeslots TS1 (461), TS2 (462) and TS3 (463) are allocated for transporting the signals within spectral region 451.

Similarly, spectral region 451 is processed for transmission via digital transport frame 460 by re-sampling that portion of digitized RF spectrum 400 corresponding to spectral region 451. The re-sampling rate used determines the number of timeslots that will be used to transport spectral region 452 and is based on the bandwidth BW2. As would be apparent to one of ordinary skill in the art upon reading this specification, the first sampling rate used for re-sampling spectral region 451 will likely not be the same as the second sampling rate used for re-sampling spectral region 451, unless BW1 and BW2 are similar in size. Continuing the example, assuming that only one timeslot is required to transport a bandwidth of size BW2, timeslots TS4 (464) is allocated for transporting the signals within spectral region 452.

As shown by this example embodiment, the signals within the non-relevant spectral region 450 are not mapped onto digital transport frame 460. Thus, timeslots on digital transport frame 460 are not wasted on this non-relevant information and may be utilized for other purposes. For example, assuming that eight timeslots would otherwise be required to map the entire bandwidth of digitized RF spectrum 400 onto digital transport frame 460, the embodiment described above has reduced the number of timeslots needed by four by only mapping the relevant regions of spectrum 400. In this manner, fewer assigned time slots are required to accommodate the digital baseband data than would be if the digital baseband data were generated for the non-relevant spectral region 450. This results in bandwidth conservation in the DAS 100.

Although FIG. 2B illustrates spectral regions 451 and 452 mapped to adjacent timeslots of digital transport frame 460, embodiments of the present invention do not require adjacent mapping. For example, if TS4 (464) was allocated for use by a different DART module, or allocated for other purposes within the DAS 100, then TS5 or any other timeslot within digital transport frame 460 may be used to transport spectral region 352.

As would be apparent to one of ordinary skill in the art upon reading this specification, the number of distinct regions within a digitized RF spectrum is not limited to only two spectral regions. In other alternate embodiments, three or more spectral regions within a digitized RF spectrum may be defined as carrying relevant signals. The number of spectral regions that can be handled as discrete signal with a DART will be limited only by the limits of the implementing hardware.

Figure 4C:
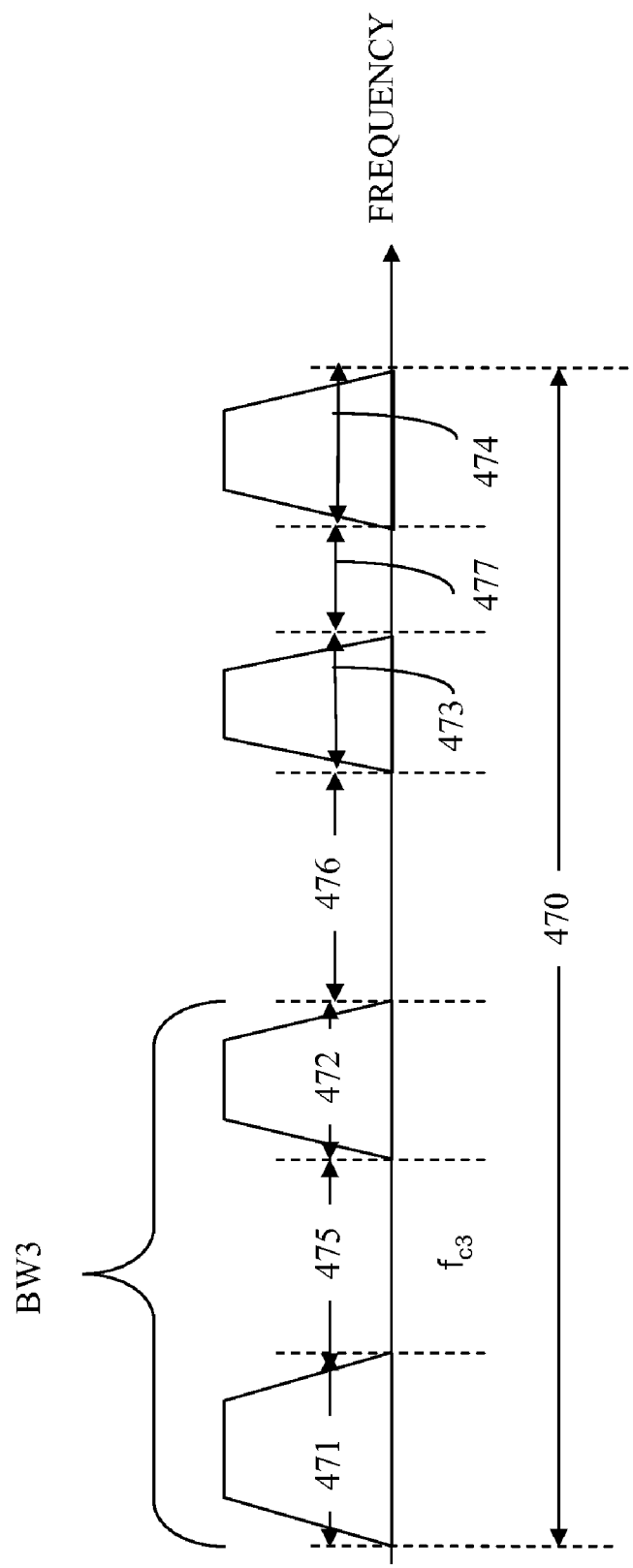

For example, FIG. 4C illustrates a digitized RF spectrum 470 having four spectral regions 471, 472, 473 and 474, each containing signals defined as relevant. Regions 475, 476 and 477 are non-relevant regions. In one embodiment, each of the spectral regions 471, 472, 473 and 474 is individually re-sampled and mapped to timeslots based on their respective bandwidth sizes, as described above for FIG. 4A. In the case where the implementing hardware is not configured to re-sample and process four spectral regions separately, two or more of the spectral regions may be grouped together to define a single spectral region. For example, in FIG. 4C, where regions 471 and 472 contain relevant signals separated by a non-relevant region 475, the entire bandwidth including regions 471, 475 and 472 (shown generally as BW3) may be grouped together, re-sampled as a distinct slice of spectrum 470 and assigned to timeslots of frame 460 based on the size of BW3. Using the re-sampling and mapping scheme described in FIGS. 4A-C, a host unit 102 and the remote units 130 communicate RF transport signals that occupy less bandwidth of the communication links 130 as compared to presently existing schemes because time slots are not assigned for one or more non-relevant spectral regions.

Figure 5:
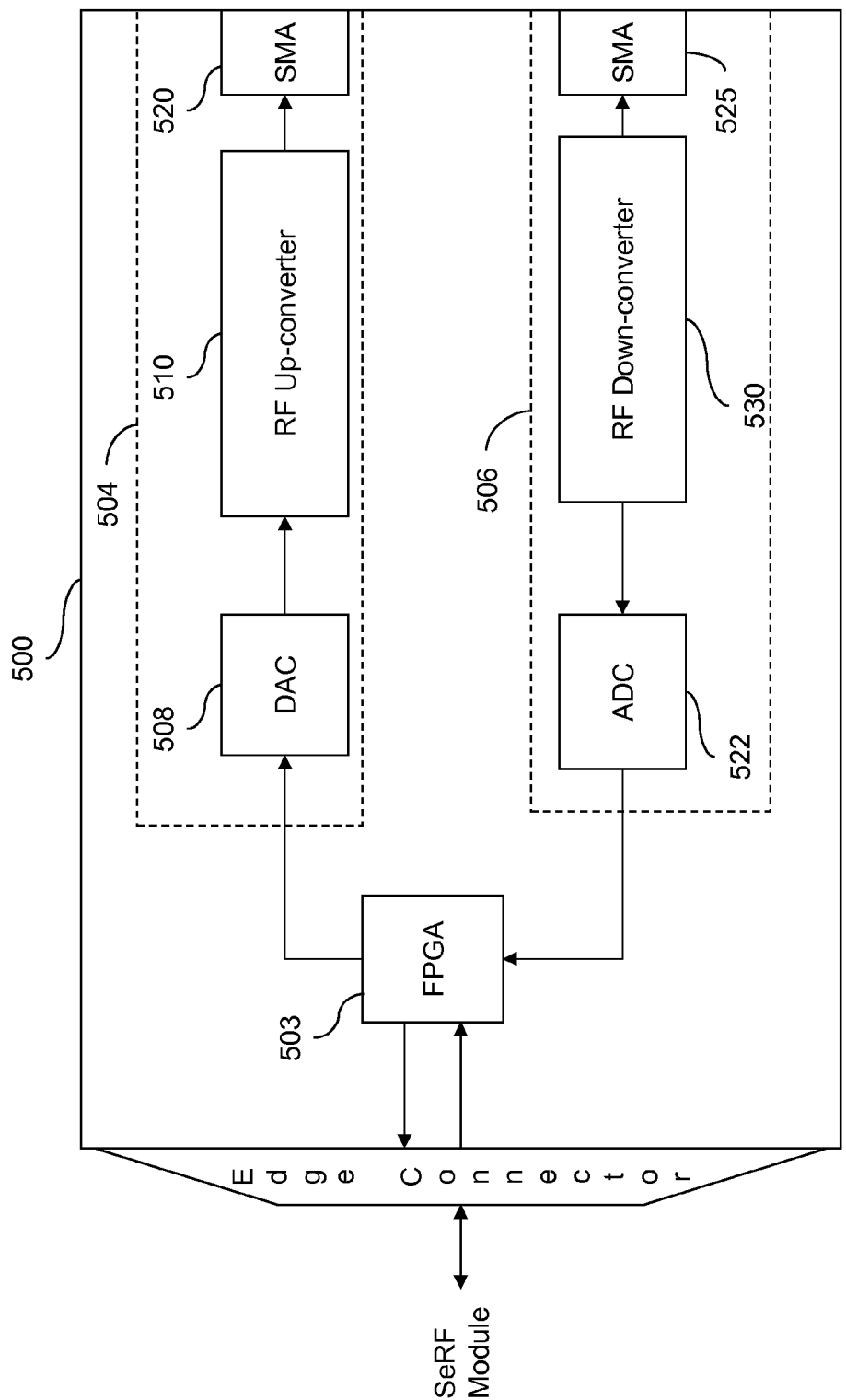
FIG. 5 is a block diagram illustrating a DART Module of one embodiment of the present invention.

FIG. 5 is a block diagram illustrating a DART Module 500 of one embodiment of the present invention. In alternate embodiments, DART Module 500 may operate as either a Host DART or a Remote DART module such as respective DART Modules 308 and 208. DART module 500 has two main signal paths; a transmission path 504 and a reception path 506. For signals received from a SeRF module, DART module 500 forms parallel digital RF data from the incoming data stream, if needed, at FPGA 503. In this embodiment, FPGA 503 is a logic device that is programmed to convert serial digital data into RF sampled data and programmed to convert RF sampled data into serial digital data. DART module 500 then converts the digital RF data to an analog signal with digital to analog converter (DAC) 508. Transmission path 504 continues with RF transmission interface 510 which filters, amplifies, and up-converts the analog signal for RF transmission. As would be readily appreciated by one of ordinary skill in the art upon reading this specification, RF transmission interface 510 will typically include an assortment of filters, amplifiers, oscillators and attenuators. In one embodiment, the transmission path exits DART module 500 at a subminiature version A RF coaxial connector (SMA) connector 520.

In the reception path 506, RF signals are converted from analog to digital and sent to the SeRF module. In one embodiment, analog RF signals are received at DART module 500 at an SMA connector 525. Reception path 506 includes an RF reception interface 530 that amplifies, down-converts, and filters the incoming RF signal. As would be readily appreciated by one of ordinary skill in the art upon reading this specification, RF reception interface 530 will typically include an assortment of filters, amplifiers, oscillators, and attenuators. After the RF reception interface 530, DART module 500 then digitizes the signal with analog to digital converter 522. FPGA 503 then provides the data stream as parallel digital RF sampled data to a SeRF module.

Figure 6:
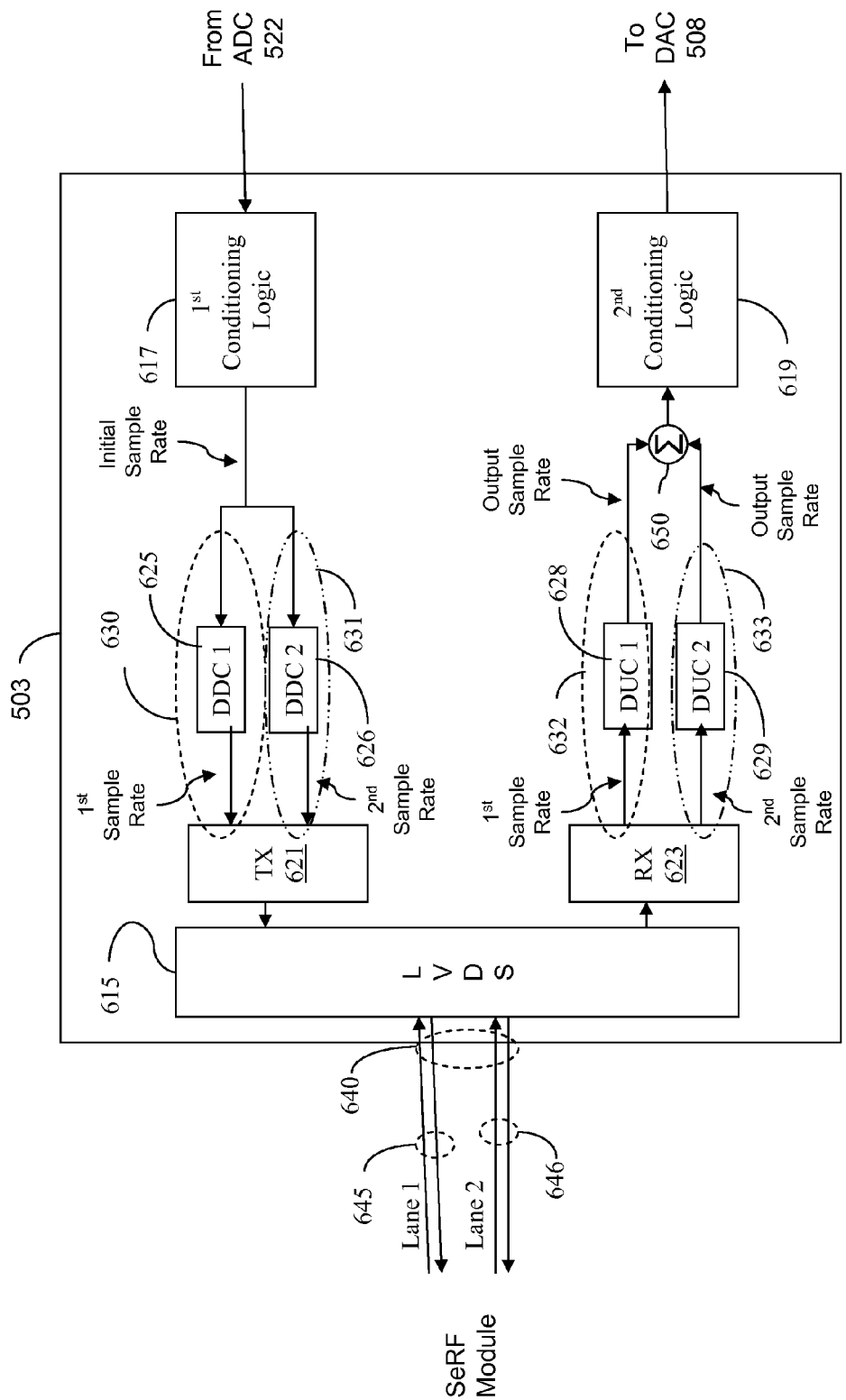
FIG. 6 is a block diagram illustrating an FPGA configuration for a DART Module of one embodiment of the present invention.

FIG. 6 is a block diagram providing further details for FPGA 503 for one embodiment of the present invention. FPGA 503, for both the upstream and downstream directions, provides separate signal processing paths for each discrete spectral region of a digitized RF spectrum (such as 400 or 460) that is to be mapped onto timeslots of the transport frame 460. Although the FPGA 503 described in FIG. 6 illustrates an FPGA configured to process two discrete spectral regions in each direction (illustrated by first and second paths 630,631 in the receive direction and first and second paths 632,633 in the transmit direction), one of ordinary skill in the art after reading this specification would appreciate that the FPGA described in FIG. 6 may be scaled upward to include additional processing paths for three or more discrete spectral regions. This scaling is limited only by the particular constraints of the underlying hardware used (for example, the number of available gates provided by the FPGA hardware selected by the DART equipment designer).

In each direction, FPGA 503 provides a first path for processing digital signals associated with the radio frequency signals in a first spectral region (such as region 451 for example) and a second path for processing digital signals associated with the radio frequency signals in a second spectral region (such as region 452, for example). For processing the reception path 506, FPGA 503 includes first conditioning logic 617, a first digital down converter 625, a second digital down converter 626 and a transmitter (TX) 621. For processing the transmission path 504, FPGA 503 includes a receiver (RX) 623, a first digital up converter 628, a second digital up converter 629, summer 650, and second conditioning logic 619. FPGA 503 further includes a low-voltage differential signaling circuit 615 that facilitates communication between the transmission and receive paths (404, 406) and a SeRF module coupled to DART Module 500. In an alternate embodiment, the first conditioning logic 617 and the second conditioning logic 619 are realized using shared conditioning logic.

In the embodiment shown in FIG. 6, FPGA 503 is communicatively coupled to its associated SeRF Module by a bidirectional low-voltage differential signaling (LVDS) link 640. A first LVDS lane represented generally at 645 and a second LVDS lane represented generally at 646 are supported. In one implementation of this embodiment, first LVDS lane 645 and second LVDS lane 646 each transport digital baseband data at a 737.28 Mbps data rate. In this case, the first LVDS lane 645 and second LVDS lane 646 together transport digital baseband data at a 1474.56 Mbps data rate in up to six timeslots of a transport frame 460. In one embodiment, the link 640 runs at a fixed rate regardless of the payload (i.e., regardless of the number of time slots sent). One of ordinary skill in the art upon reading this specification would appreciate that in alternate embodiments of the present invention, the number of supported time slots is a design choice based on the number of timeslots supported by the particular hardware used.

In one embodiment of receive path 506, in operation, ADC 522 receives an analog RF spectrum from RF reception interface 530 and digitizes the complete analog RF spectrum using an initial sampling rate corresponding to the size of the bandwidth of the analog spectrum. The first conditioning logic 617 receives the digitized data samples from the analog-to-digital converter 522, and directs the digitized data samples to digital-down-converters (DDC) 625 and 626. The first digital down converter 625 and the second digital down converter 626 each receive digitized data samples of the full RF spectrum.

The first and second digital down converters 625 and 626 are each configured to independently process distinct spectral regions of the sampled RF spectrum. Returning to the example of FIG. 4A, in one embodiment, first digital down converter 625 is programmed to filter out all signals except those in spectral region 451. For example, in one embodiment, first digital down converter 625 is programmed with both the center frequency of the first spectral region 451 (shown as $f_{c1}$) and the bandwidth BW1 of spectral region 451. Digital down converter 625 thus applies a band-pass filter to the sampled RF spectrum, allowing only the data corresponding to the spectral region $f_{c1} - \frac{1}{2}(BW1)$ to $f_{c1} + \frac{1}{2}(BW1)$ to pass. Digital down converter 625 then converts the data corresponding to the first spectral region 451 into digital baseband signals by re-sampling the data from the initial sampling rate used to digitize the analog RF spectrum to a first sampling rate selected based on the size of BW1. The first sampling rate will determine the number of timeslots used to transport the digital baseband signals corresponding to spectral region 451.

In the same way, second digital down converter 626 is programmed with both the center frequency of the second spectral region 454 (shown as $f_{c2}$) and the bandwidth BW2 of spectral region 452. Digital down converter 626 then applies a band-pass filter to the sampled RF spectrum, allowing only the data corresponding to the spectral region $f_{c2}-½(BW2)$ to $f_{c2}+½(BW2)$ to pass. Digital down converter 626 then converts the data corresponding to the second spectral region 452 into digital baseband signals by re-sampling the data from the initial sampling rate used to digitize the analog RF spectrum to a second sampling rate selected based on the size of BW2. The second sampling rate will determine the number of timeslots used to transport the digital baseband signals corresponding to spectral region 452.

Serialized transmitter (TX) 621 is positioned to receive the first set of digital baseband data samples from the first digital down converter 625 at the first sampling rate and the second set of baseband data sample from the second digital down converter 626 at the second sampling rate. Transmitter 621 multiplexes and serializes these two sets of baseband data into timeslots and provides the serialized data to the SeRF Module via the low-voltage differential signaling circuit 615.

In one embodiment of transmit path 506, in operation, DART Module 500 receives digital baseband data from the SeRF module via the low-voltage differential signaling circuit 615. Serialized receiver 623 is positioned to receive serialized input from the low-voltage differential signaling circuit 615 and to direct data from timeslots associated with the first spectral region 451 to the first digital up converter 628, and data from timeslots associated with the first spectral region 451 to the second digital up converter 629. The first digital up converter 628 receives the data from timeslots associated with the first spectral region 451 at the first sampling rate and up-converts the baseband data by re-sampling the data from the first sampling rate to an output sampling rate. The second digital up converter 629 receives the data from timeslots associated with the second spectral region 452 at the second sampling rate and up-converts the baseband data by re-sampling the data from the second sampling rate to the same output sampling rate used by first digital up converter 628. By upconverting both sets of baseband data to the same output sample rate, the up-converted data sample output from both digital upconverters 628, 629 can be readily summed together for further processing by DART Module 500 as a single data signal. Accordingly, summer 650 sums the upconverted data sample outputs from digital upconverters 628, 629 and provides the summed signal to DAC 508 via $2^{nd}$ conditioning Logic 619.

Because FPGA 503 is a field programmable device, it can be adjusted to meet changing needs of the end user. For example, the center frequencies $f_{c1}$ and $f_{c2}$ can be reprogrammed into FPGA 503 in order to shift the locations of spectral regions 451 and 452 within spectrum 400. Similarly BW1 and BW2 may be adjusted to accommodate larger or narrower bandwidths. The number and/or position of timeslots within frame 460 provisioned for each discrete spectral region can also be reconfigured. As mentioned previously, the number of individual signal paths for handling additional spectral regions may be increased by configuring the FPGA with additional digital up converters and digital down converters. In one embodiment, a plurality of predefined configuration builds are stored in a memory, for example within a SeRF Module. In such an embodiment, a DART Module's FPGA can be reconfigured by pushing a new build image onto the FPGA.

Figure 7:
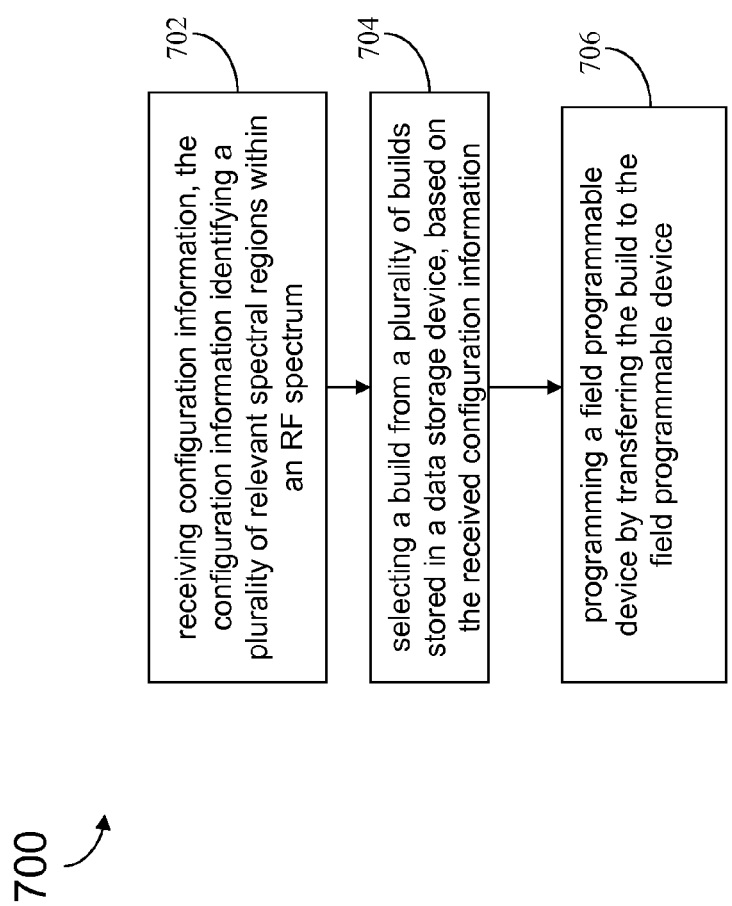
FIG. 7 is a flow chart illustrating a method of one embodiment of the present invention.

FIG. 7 is a flow diagram a method 700 of one embodiment of the present invention. The method begins at 702 with receiving configuration information, the configuration information identifying a plurality of relevant spectral regions within an RF spectrum. In one embodiment, each relevant spectral region is identified by a center frequency and bandwidth. The relevant spectral regions are indicative of separate radio frequency bands of interest that are to be transported via a digital DAS. Configuration information can also information regarding the number and position of timeslots available for allocation to each spectral region. In one embodiment, the configuration information may be received via a user interface either directly or indirectly coupled to the DART module. The method proceeds to 704 with selecting a build from a plurality of builds stored in a data storage device, such as but not limited to a flash memory. Selection of the build is based on the received configuration information. The method proceeds to 706 with programming a field programmable device, such as an FPGA, by transferring the build to the field programmable device. Although the example of an FPGA has been used in this specification, other field programmable devices are contemplated as within the scope of embodiments of the present invention.

Figure 8:
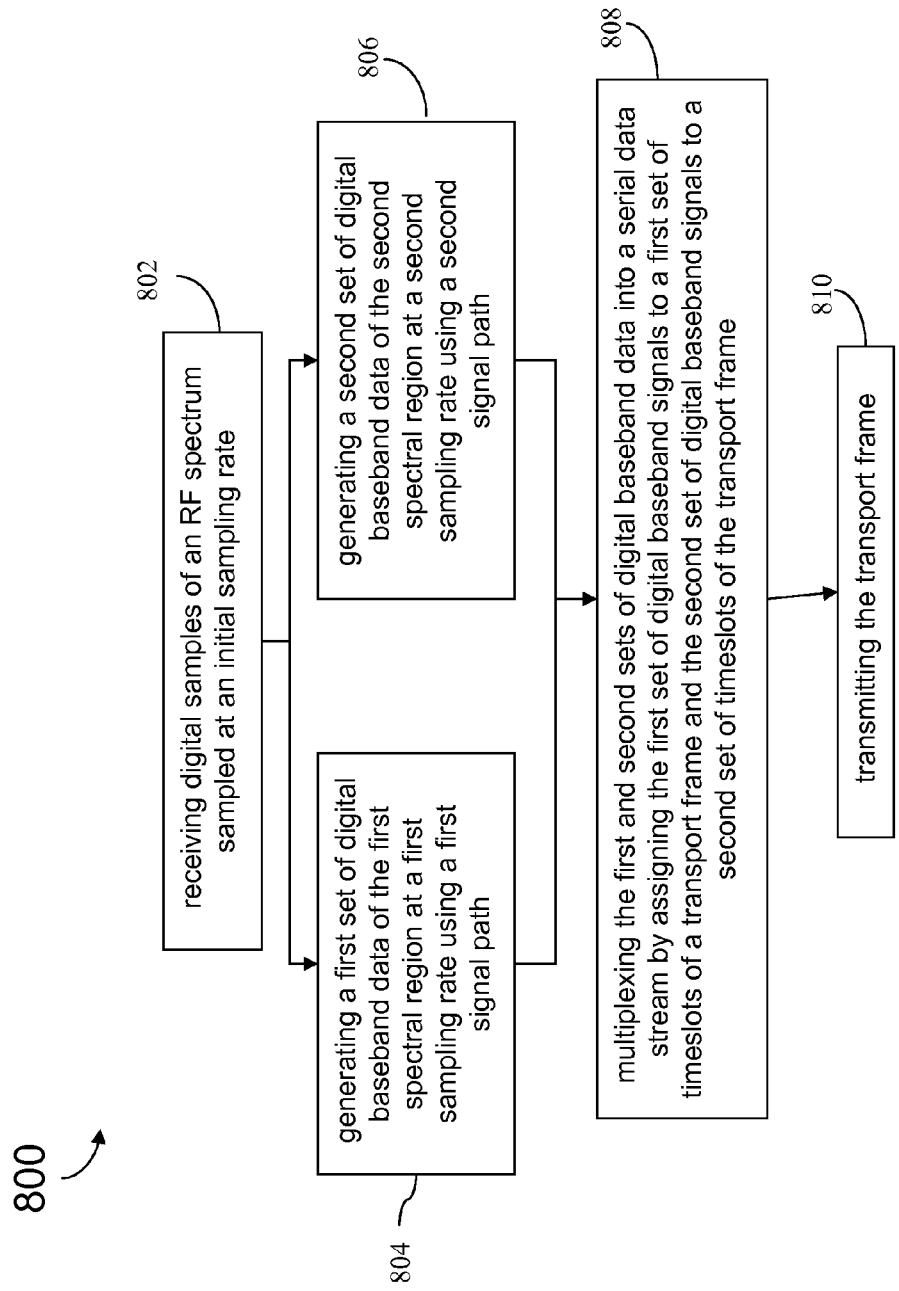
FIG. 8 is a flow chart illustrating a method of one embodiment of the present invention.

FIG. 8 is a flow chart illustrating a method 800 of one embodiment of the present invention. The method begins at 802 with receiving digital samples of an RF spectrum sampled at an initial sampling rate. The RF spectrum comprises a first spectral region that includes signals of interest and a second spectral region that includes signals of interest. In one embodiment, the first and second spectral regions are separated by a non-relevant spectral region. The method proceeds to 804 and 806, which occur in parallel. At 804 the method proceeds with generating a first set of digital baseband data of the first spectral region at a first sampling rate using a first signal path. At 806 the method proceeds with generating a second set of digital baseband data of the second spectral region at a second sampling rate using a second signal path. As described above, the first sampling rate and the second sampling rate are determined from the bandwidths of the first spectral region and second spectral regions, respectively. The first signal path comprises a first digital down converter that filters the RF spectrum to pass only data signals corresponding to the first spectral region. Those data signals are then re-sampled to the first sampling rate, which will determine the number of timeslots the first set of digital baseband data will occupy on the transport frame. The second signal path comprises a second digital down converter that filters the RF spectrum to pass only data signals corresponding to the second spectral region. Those data signals are then re-sampled to the second sampling rate, which will determine the number of timeslots the second set of digital baseband data will occupy on the transport frame.

The method then proceeds to 808 where the first and second sets of digital baseband data are multiplexed into a serial data stream by assigning the first set of digital baseband signals to a first set of timeslots of a transport frame and the second set of digital baseband signals to a second set of timeslots of the transport frame. The method proceeds to 810 with transmitting the transport frame. As would be appreciated by one of ordinary skill in the art, by processing the first and second spectral regions separately and at sample times corresponding to their respective bandwidths, the total number of timeslots necessary to transport the signals is less than if the entire received RF spectrum was converted to baseband and assigned to timeslots. In one embodiment, transmitting the transport frame comprises a SeRF Module transmitting the transport frame via an optical fiber. In the case where this method is implemented at a host unit, the transport frame is transmitted via the Host SeRF Module to a remote unit. In the case where this method is implemented at a remote unit, the transport frame is transmitted via the Remote SeRF Module to the host unit.

Figure 9:
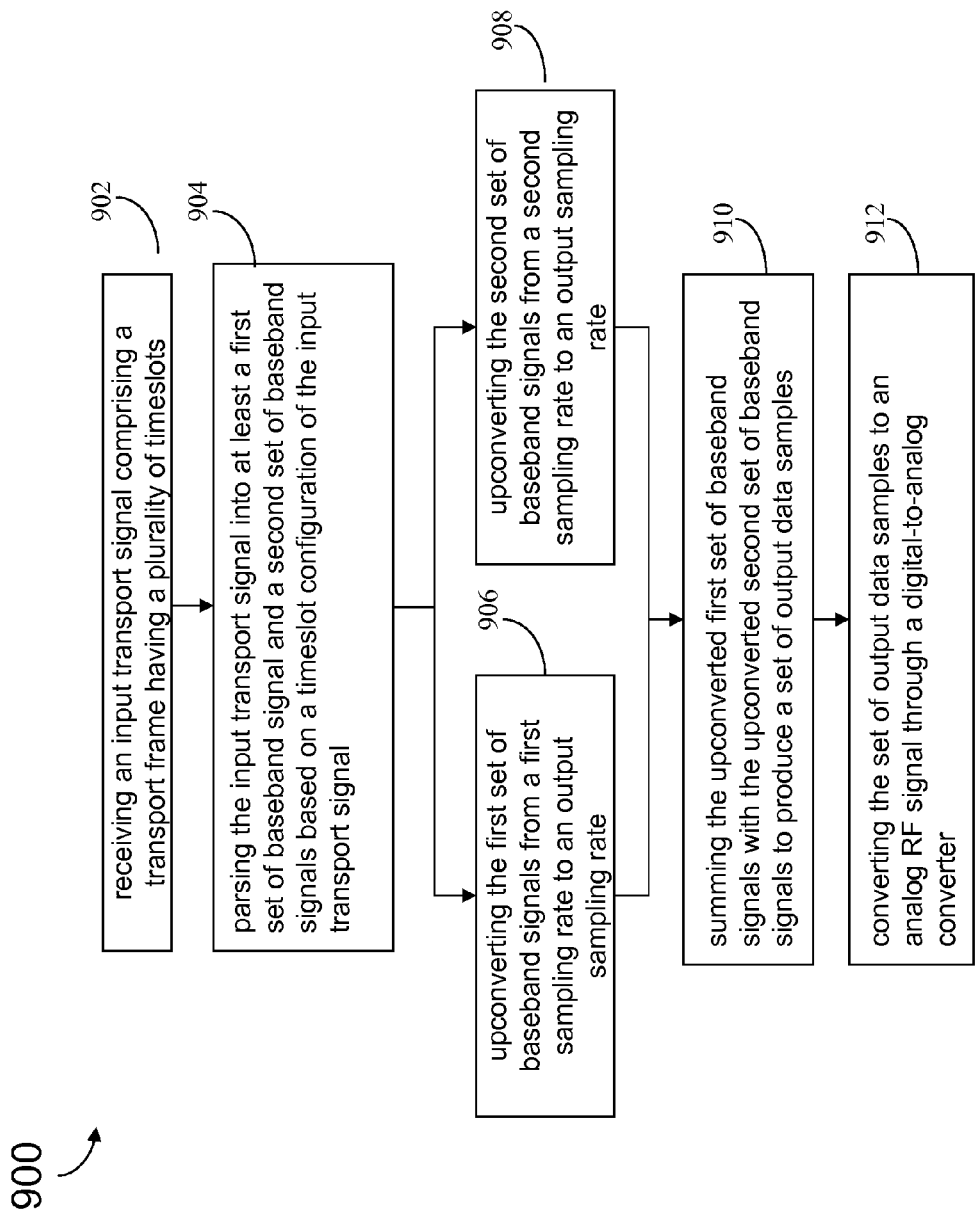
FIG. 9 is a flow chart illustrating a method of one embodiment of the present invention.

FIG. 9 is a flow diagram of a method 900 of one embodiment of the present. The method begins at 902 with receiving an input transport signal comprising a transport frame having a plurality of timeslots. The method proceeds to 904 with parsing the input transport signal into at least a first set of baseband signal and a second set of baseband signals based on a timeslot configuration of the input transport signal. In one embodiment, demultiplexing logic in the low-voltage differential signaling circuit parses the input stream and sends the baseband data to either a first digital up converter or second digital up converter based on the timeslot configuration. The method then proceeds to blocks 906 and 908, which run in parallel.

At block 906, the method proceeds with upconverting the first set of baseband signals from a first sampling rate to an output sampling rate. At block 908 the method proceeds with upconverting the second set of baseband signals from a second sampling rate to an output sampling rate. By upconverting both sets of baseband data to the same output sample rate, the up-converted data sample output from both digital upconverters can be readily summed together into a single signal of data samples. Accordingly, the method proceeds to 910 with summing the upconverted first set of baseband signals with the upconverted second set of baseband signals to produce a set of output data samples. The method then proceeds to 912 with converting the set of output data samples to an analog RF signal through a digital-to-analog converter.

Although specific embodiments have been illustrated and described herein, it will be appreciated by those of ordinary skill in the art that any arrangement, which is calculated to achieve the same purpose, may be substituted for the specific embodiment shown. This disclosure is intended to cover any adaptations or variations of the present invention. Therefore, it is manifestly intended that this invention be limited only by the claims and the equivalents thereof.

What is claimed is:

1. A digital-analog radio transceiver for providing digital transport of signals on a radio-frequency (RF) distributed antenna system, the transceiver comprising:
   a receive path circuit including an RF reception interface coupled to an analog-to-digital converter, the analog-to-digital converter receiving a down-converted analog RF spectrum from the RF reception interface and producing a digitized RF spectrum at an input sampling rate;
   a logic device coupled to the receive path circuit and receiving the digitized RF spectrum at the input sampling rate, the logic device producing a first set of baseband data samples at a first sampling rate, the first set of baseband data samples corresponding to a first spectral region of the analog RF spectrum, the logic device further producing a second set of baseband data samples at a second sampling rate, the second set of baseband data samples corresponding to a second spectral region of the analog RF spectrum;
   wherein the logic device maps the first set of baseband data samples at the first sampling rate to a first set of timeslots of a serial data stream transport frame and maps the second set of baseband data samples at the second sampling rate to a second set of timeslots of the transport frame.

2. The transceiver of claim 1, wherein the first set of timeslots consists of a first number of timeslots based on a bandwidth of the first spectral region and the second set of timeslots consists of a second number of timeslots based on a bandwidth of the second spectral region.

3. The transceiver of claim 1, wherein the analog RF spectrum comprises a third spectral region between the first spectral region and the second spectral region, wherein data from the third spectral region is not mapped onto timeslots of the transport frame.

4. The transceiver of claim 1, the logic device including at least a first digital down converter and a second digital down converter, the first digital down converter and the second digital operating in parallel and each receiving the digitized RF spectrum at the input sampling rate;
   the first digital down converter converting data corresponding to the first spectral region of the analog RF spectrum into the first set of digital baseband data at the first sampling rate, where the first sampling rate is a function of a size of a bandwidth of the first spectral region;
   the second digital down converter converting data corresponding to the second spectral region of the analog RF spectrum into the second set of digital baseband data at the second sampling rate, where the second sampling rate is a function of a size of a bandwidth of the second spectral region.

5. The transceiver of claim 4, the logic device further comprising a serialized transmitter receiving the first set of digital baseband data at the first sampling rate and the second set of digital baseband data at the second sampling rate and mapping the first set of digital baseband data to the first set of timeslots and the second set of digital baseband data to the second set of timeslots.

6. The transceiver of claim 1, further comprising:
   a transmission path circuit including an RF transmission interface coupled to an digital-to-analog converter;
   the logic device further coupled to the transmission path circuit, the logic device receiving an input transport frame having a plurality of timeslots, wherein a first set of the plurality of timeslots includes a third set of baseband data samples at the first sampling rate, the third set of baseband data samples corresponding to the first spectral region of the analog RF spectrum, and wherein a second set of the plurality of timeslots includes a fourth set of baseband data samples at the second sampling rate, the fourth set of baseband data samples corresponding to the second spectral region of the analog RF spectrum;
   wherein the logic device up-converts the third set of baseband data samples at the first sampling rate to a first set of RF data samples corresponding to the first spectral region at an output sampling rate;
   wherein the logic device up-converts the fourth set of baseband data samples at the second sampling rate to second set of RF data samples corresponding to the second spectral region at the output sampling rate;
   wherein the logic device sums the first set of RF data samples with the second set of RF data samples to produce a set of output data samples at the output sampling rate;
   wherein the digital-to-analog converter receives the output data samples at the output sampling rate and generates an output analog signal from the output data samples;
   wherein the RF transmission interface receives the output analog signal and up-converts the output analog signal into an analog RF signal within the analog RF spectrum.

7. The transceiver of claim 6, the logic device including at least a first digital up converter and a second digital up converter, the first digital up converter and the second digital up converter operating in parallel,
   the first digital up converter receiving the third set of digital baseband signals and converting the third set of digital baseband signals into the first set of RF data samples corresponding to the first spectral region of the analog RF spectrum at the output sampling rate;

the second digital up converter receiving the fourth set of digital baseband samples and converting the third set of digital baseband signals into the second set of RF data samples corresponding to the second spectral region of the analog RF spectrum at the output sampling rate.

8. The transceiver of claim 7, the logic device further comprising a serialized receiver receiving the input transport frame and parsing timeslots of the transport frame to the first digital up converter and the second digital up converter based on a timeslot configuration of the input transport frame.

9. The transceiver of claim 6, wherein the analog RF spectrum comprises a third spectral region between the first spectral region and the second spectral region, wherein data from the third spectral region is not mapped onto timeslots of the input transport frame.

10. The transceiver of claim 1, wherein the logic circuit comprises a field programmable device.

11. The transceiver of claim 1, wherein the first spectral region and second spectral region are user selectable from a plurality of pre-built logic circuit configurations.

12. The transceiver of claim 1, wherein a center frequency and bandwidth size that define the first spectral bandwidth are user reconfigurable.

13. A digital-analog radio transceiver for providing digital transport of signals on a radio-frequency (RF) distributed antenna system, the transceiver comprising:
a transmission path circuit including an RF transmission interface coupled to an digital-to-analog converter;
a logic device further coupled to the transmission path circuit, the logic device receiving an input transport frame having a plurality of timeslots, wherein a first set of the plurality of timeslots includes a first set of baseband data samples at first sampling rate, the third set of baseband data samples corresponding to a first spectral region of an analog RF spectrum, and wherein a second set of the plurality of timeslots includes a second set of baseband data samples at a second sampling rate, the second set of baseband data samples corresponding to a second spectral region of the analog RF spectrum;
wherein the logic device up-converts the first set of baseband data samples at the first sampling rate to a first set of RF data samples corresponding to the first spectral region at an output sampling rate;
wherein the logic device up-converts the second set of baseband data samples at the second sampling rate to second set of RF data samples corresponding to the second spectral region at the output sampling rate;
wherein the logic device sums the first set of RF data samples with the second set of RF data samples to produce a set of output data samples at the output sampling rate;
wherein the digital-to-analog converter receives the output data samples at the output sampling rate and generates an output analog signal from the output data samples;
wherein the RF transmission interface receives the output analog signal and up-converts the output analog signal into an analog RF signal within the analog RF spectrum.

14. The transceiver of claim 13, wherein the analog RF spectrum comprises a third spectral region between the first spectral region and the second spectral region, wherein data from the third spectral region is not mapped onto timeslots of the input transport frame.

15. A method for providing digital transport of signals on a radio-frequency (RF) distributed antennal system, the method comprising:

receiving digital samples of an analog RF spectrum sampled at an initial sampling rate;
generating a first set of digital baseband data of the first spectral region at a first sampling rate;
in parallel with generating the first set of digital baseband data, generating a second set of digital baseband data of the second spectral region at a second sampling rate;
multiplexing the first set of digital baseband data and the second set of digital baseband data into a serial data stream by assigning the first set of digital baseband signals to a first set of timeslots of a transport frame and the second set of digital baseband signals to a second set of timeslots of the transport frame; and
transmitting the transport frame.

16. The method of claim 15, wherein the first sampling rate is determined from a bandwidth size of the first spectral region and the second sampling rate is determined from a bandwidth size of the second spectral region.

17. The method of claim 15, wherein generating the first set of digital baseband data of the first spectral region further comprises filtering the digital samples of the analog RF spectrum to pass only data signals corresponding to the first spectral region; and
wherein generating the second set of digital baseband data of the second spectral region further comprises filtering the digital samples of the RF spectrum to pass only data signals corresponding to the second spectral region.

18. The method of claim 15, wherein the first set of timeslots consists of a first number of timeslots based on a bandwidth of the first spectral region and the second set of timeslots consists of a second number of timeslots based on a bandwidth of the second spectral region.

19. The method of claim 15, wherein the analog RF spectrum comprises a third spectral region between the first spectral region and the second spectral region, wherein data from the third spectral region is not mapped onto timeslots of the transport frame.

20. The method of claim 15, further comprising:
receiving configuration information, the configuration information identifying a plurality of relevant spectral regions within the analog RF spectrum;
selecting a build from a plurality of builds stored in a data storage device based on the configuration information; and
programming a field programmable device by transferring the build to the field programmable device.

21. The method of claim 20, wherein the configuration information identifies a center frequency and bandwidth size for defining the first spectral region.

22. A method for providing digital transport of signals on a radio-frequency (RF) distributed antennal system, the method comprising:
receiving an input transport signal comprising a transport frame having a plurality of timeslots;
parsing the input transport signal into at least a first set of baseband signal and a second set of baseband signals based on a timeslot configuration of the input transport signal;
upconverting the first set of baseband signals from a first sampling rate to an output sampling rate;
in parallel with upconverting the first set of baseband signals, upconverting the second set of baseband signals from a second sampling rate to the output sampling rate;
summing the upconverted first set of baseband signals with the upconverted second set of baseband signals to produce a set of output data samples; and converting the set of output data samples to an analog RF signal through a digital-to-analog converter.

23. The method of claim 22, wherein upconverting the first set of baseband signals further comprises generating a first set of RF data samples corresponding to a first spectral region of an analog RF spectrum; and wherein upconverting the second set of baseband signals further comprises generating a second set of RF data samples corresponding to a second spectral region of the analog RF spectrum.

24. The method of claim 23, wherein the analog RF spectrum comprises a third spectral region between the first spectral region and the second spectral region, wherein data from the third spectral region is not mapped onto timeslots of the input transport frame.

25. The method of claim 22, wherein the timeslot configuration of the input transport signal comprises a first set of timeslots consisting of a first number timeslots corresponding to a bandwidth of the first spectral region and a second set of timeslots consisting of a second number of timeslots corresponding to a bandwidth of the second spectral region.

26. The method of claim 22, further comprising:

receiving configuration information, the configuration information identifying a plurality of relevant spectral regions within an analog RF spectrum;

selecting a build from a plurality of builds stored in a data storage device based on the configuration information; and programming a field programmable device by transferring the build to the field programmable device.

27. The method of claim 26, wherein the configuration information identifies a center frequency and bandwidth size for defining a first spectral region.

* * * * *